Figure 1:
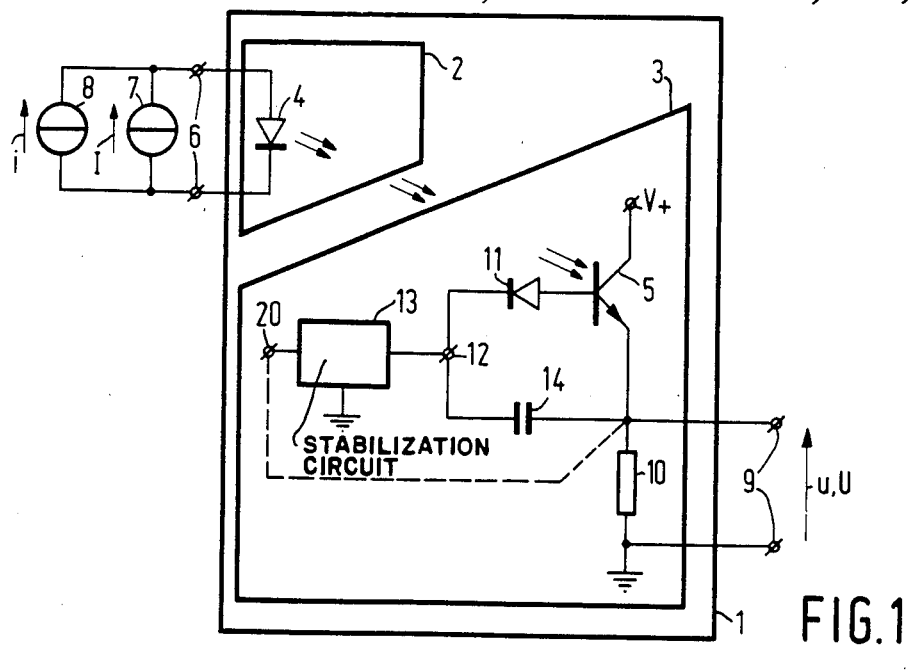

United States Patent [19]

Rademaker et al.

[11] Patent Number: 4,709,154
[45] Date of Patent: Nov. 24, 1987

[54] OPTO-ELECTRICAL SIGNAL CONVERTER WITH STABILIZATION

[75] Inventors: Gerrit Rademaker; Franciscus A. A. van der Veer, both of Hilversum, Netherlands

[73] Assignee: U.S. Philips Corporation, New York, N.Y.

[21] Appl. No.: 767,305

[22] Filed: Aug. 19, 1985

[30] Foreign Application Priority Data

Aug. 20, 1984 [NL] Netherlands ............... 8402544

[51] Int. Cl.$^4$ ............................................. G02B 27/00
[52] U.S. Cl. .................................... 250/551; 307/311
[58] Field of Search ........................... 250/551, 214 R; 307/311; 455/602, 608, 617, 619, 611, 614

[56] References Cited

U.S. PATENT DOCUMENTS 4,039,863 8/1977 Ohhinata et al. ................. 307/311
4,176,288 11/1979 Komatsu et al. ................. 307/311

OTHER PUBLICATIONS

"Differential Optical Coupler Hits New High in Linearity, Stability", by Olschewski, Electronics, Jan. 19, 1978, pp. 121–125.

Primary Examiner—David C. Nelms
Attorney, Agent, or Firm—Jack E. Haken

[57] ABSTRACT

The invention relates to an opto-electrical signal converter for linearly converting a signal consisting of an alternating current superimposed on a direct current into a signal consisting of an alternating voltage superimposed on a direct voltage. Such a converter comprises the combination of a light diode and a photosensitive element optically coupled therewith, which combination is designated as optocoupler.

The invention has for its object to provide a converter having a good linear signal transmission, the value of the output signal of the converter being independent of the properties of the optocoupler used.

For this purpose, the converter is provided with a transistor, of which a semiconductor junction connected to the base of the transistor is AC-connected parallel to the base-emitter junction of the transistor and is DC-connected in series with a stabilization circuit.

As a result, a linear AC and DC transmission, respectively, is reached independently of ageing and of the temperature behaviour of the optocoupler used.

9 Claims, 4 Drawing Figures

OPTO-ELECTRICAL SIGNAL CONVERTER WITH STABILIZATION

The invention relates to an opto-electrical signal converter for linearly converting a signal consisting of an alternating current superimposed on a direct current into a signal consisting of an alternating voltage superimposed on a direct voltage. It comprises a light transmitter and a light receiver which responds to the light of the transmitter and a photosensitive element for converting light emitted by the transmitter into a current corresponding thereto.

Such an arrangement is known from the article of B. Olschewski entitled: "Differential optical coupler hits new high in linearity, stability", published in Electronics, 13 Jan. 1978, p. 121-125. The arrangement described herein comprises a light transmitter and a light receiver. The light transmitter comprises a light diode, which is, for example, in the form of a light-emitting diode (LED). The light receiver comprises a photodiode or a phototransistor. The combination of the photodiode or the phototransistor and the light diode optically coupled therewith is designated an optocoupler.

The aforementioned article describes two methods of realizing an opto-electrical converter having a good linearity. This good linearity is of importance in analogue signal transmission, in which a low harmonic distorsion is required. A first method utilizes two optocouplers. In this method, the non-linearity of the transmission ratio of one of the optocouplers is used to compensate for the nonlinearity of the transmission ratio of the other optocoupler. The second method utilizes a light-emitting diode and two photodiodes, which are exposed to the same extent by the LED. One of the photodiodes is included in a negative feedback circuit for the LED for linearizing the light emitted by the LED as a function of the current flowing through the LED. The other photodiode consequently receives the same linearized quantity of light. When in this manner an optimum linearity is obtained, in the first method the nonlinearities of the transmission ratios of both optocouplers should correspond as accurately as possible to each other, in other words: the two optocouplers should be "matched". In the second method, both the quantities of light received by both photodiodes and the conversion efficiencies of the two photodiodes should correspond as accurately as possible to each other. A problem with respect to these two methods is that use should then be made of optocouplers specially selected for the purpose.

The invention has for its object to provide in a simple and efficacious manner a converter having a good linear transmission, in which the output signal of the converter has a given value and is independent of properties of the optocoupler used.

According to the invention, the converter of the kind mentioned in the opening paragraph is characterized in that the converter comprises a transistor, whose emitter is coupled to a point of common potential. A semiconductor junction is provided which is connected to the base of the transistor so that the semiconductor junction, viewed from the base of the transistor, is connected in the same conductive sense to the photosensitive element as the base-emitter junction of the transistor. The semiconductor junction is D.C.-connected in series with a stabilization circuit in order that either the direct current component on the alternating current component through the main current path of the transistor is stabilized at a adjustable level. The semiconductor junction is A.C.-connected parallel to the base-emitter junction of the transistor so that a proportionality between the transmission direct current resistance and the transmission alternating current resistance of the transistor is realized.

An advantage of the arrangement according to the invention is that with the use of one optocoupler a linear A.C. or D.C. transmission is attained, independent of aging and of the temperature behavior.

A further feature in accordance with a preferred embodiment of the invention is that the stabilization circuit is provided with a terminal for connecting a first reference direct voltage source. The stabilization circuit then comprises a voltage divider connected between this terminal and the point of common potential. A centre tap on the voltage divider is coupled to the base of the transistor via the semiconductor junction in order that the value of the direct current component of the current through the main current path of the transistor is kept constant at an adjustable level by means of the first reference direct voltage source. This embodiment has the advantage that it is simple and can be realized with a minimum number of electrical components.

In another embodiment the stabilization circuit comprises a low-pass filter and a subtraction device which is connected in series and is provided with a first input coupled to the emitter of the transistor and with a second input for connecting a second reference direct voltage source. The stabilization circuit then comprises a first variable resistor provided with a control input. The control input is coupled to the output of the subtraction device and the variable resistor is connected via the semiconductor junction to the base of the transistor and is connected to the point of common potentials the resistance value of the variable resistor is thus adjusted in dependence upon an output signal emitted by the subtraction device in such a manner that the value of the direct current component of the current through the main current path of the transistor is kept constant at a level adjustable by means of a direct voltage supplied by the second reference direct voltage source. The advantage of the two last-mentioned features is that linear A.C. transmission is possible. Furthermore, saturation of the transistor has become impossible, as a result of which the driving range of the light transmitter is enlarged and the latter can be adjusted at a higher bias current; moreover signal-to-noise ratio is improved.

In another embodiment of the invention the stabilization circuit comprises a highpass filter connected to the emitter of the transistor and an AC/DC converter connected to the filter, a second subtraction device is connected by a first output to the AC/DC converter and is provided with a second input for connecting a third reference direct voltage source. The stabilization circuit comprises a second variable resistor provided with a control input. The control input is coupled to the output of the subtraction device, and the variable resistor is connected via the semiconductor junction to the base of the transistor and is connected to the point of common potential so that the resistance value of the variable resistor is adjusted in dependence upon an output signal supplied by the subtraction device in such a manner that the value of the alternating current component of the current through the main current path of the transistor is kept constant at a level adjustable by means of a direct voltage supplied by the third reference direct voltage source. This has the additional advantage of linear DC transmission.

Figure 2:
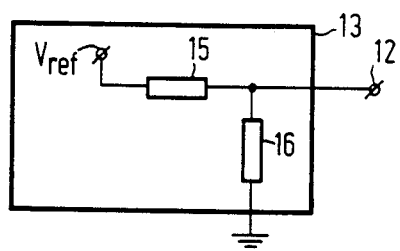
Figure 3:
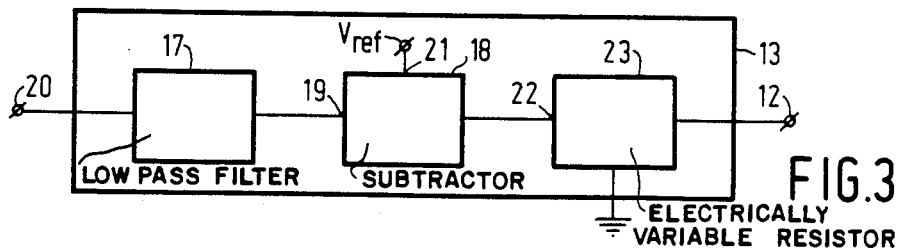
Figure 4:
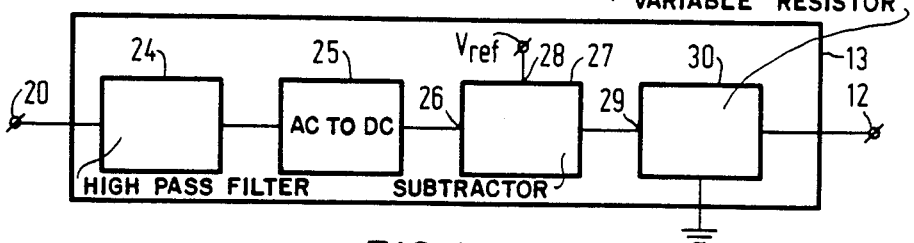

The invention will now be described more fully with reference to embodiments shown in the Figures, the same reference numerals designating corresponding elements. In the drawing:

FIG. 1 shows an embodiment of an opto-electrical signal converter according to the invention, FIG. 2 shows a first embodiment of a stabilization circuit for use in an opto-electrical signal converter as shown in FIG. 1, FIG. 3 shows a second embodiment of a stabilization circuit for use in an opto-electrical signal converter as shown in FIG. 1, FIG. 4 shows a third embodiment of a stabilization circuit for use in an opto-electrical signal converter as shown in FIG. 1.

FIG. 1 shows an opto-electrical signal converter 1. This converter 1 comprises a light transmitter 2 and a light receiver 3 responding to the light indicated by two adjacent parallel arrows. The light transmitter 2 comprises a light diode 4, which is, for example, in the form of a light-emitting diode or a laser diode. The light receiver 3 comprises a photosensitive element, for example a phototransistor 5. An optocoupler is to be understood to mean hereinafter the combination of the light diode 4 and the photosensitive element. The light diode 4 is connected between two input terminals 6. Two parallel-connected current sources 7, 8 are connected to the pair of terminals 6. The first current source 7 supplies a direct current I, which provides a bias current in the light diode 4. The second current source 8 supplies an alternating current i. Alternating current i represents, for example, an information signal for example, from telephone and telegraph systems. The phototransistor 5 in this embodiment is of the npn type. The collector of the phototransistor 5 is connected through a terminal $V_+$ to a supply source not shown in the Figure. The emitter of the phototransistor 5 is coupled to ground in this embodiment through a resistor 10. An output alternating voltage u and an output direct voltage U are derived by means of this resistor 10 from the current through the main current path of the phototransistor 5. These voltages u,U can be derived through two output terminals 9 on either side of the emitter resistor 10. As will be explained more fully, the following proportionality exists between the input currents i,I and the output voltage u,U:

$$\frac{I}{i}\bigg|_{input} \cdot \cdot \frac{U}{u}\bigg|_{output} \quad (1)$$

Since the converter 1 operates in accordance with the proportionality (1), a good linear signal transmission is possible independently of the properties of the converter 1. A good linear signal transmission is of importance in systems in which an analog signal transmission is used, particularly for limiting the harmonic distortion.

The phototransistor 5 is provided with an external base connection. A semiconductor junction 11 thus connected to the base of the phototransistor 5. The semiconductor junction 11 in this embodiment takes the form of a diode, although other forms may be used, such as, for example, a base-emitter junction of a transistor or a base-emitter junction of a transistor whose collector is connected to the base of this transistor. The semiconductor junction 11, viewed from the base of the phototransistor, is connected in the same conductive sense as the base-emitter junction of the phototransistor. The diode 11, whose cathode is connected to the connection terminal 12, is DC-connected is series with a stabilization circuit 13 which is connected between the connection terminal 12 and ground. The cathode of the diode 11 is AC-coupled to the emitter of the phototransistor 5. The coupling is realized in this embodiment by providing a capacitor 14 having a sufficiently large capacitance value. Another form of an AC coupling may be obtained by connecting a first capacitor between the connection terminal 12 and ground potential for decoupling the stabilization circuit 13 and by connecting a second capacitor between the emitter of the phototransistor and ground for decoupling the resistor 10. In this case at least one collector resistor having a suitable value should be included in the collector circuit of the phototransistor 5 for deriving the desired alternating voltage u.

The light diode 4 emits light, which is modulated an intensity by the alternating current i superimposed on the direct current I. This light is collected by the phototransistor 5, as a result of which a current is generated in the base of the phototransistor 5. In general, the relation between the current through the light diode 4 and the current generated in the base of the phototransistor 5 is reasonably linear. This relation, which is determined by the transmission function of the optocoupler, is different, however, for each optocoupler. The transmission function of an optocoupler varies with time due to aging phenomena especially of the light diode 4. Moreover, the value of the transmission function of an optocoupler depends upon the temperature. This results in that therefore, optocouplers cannot be readily exchanged due to their different properties and reproducibility of the output signal of an opto-electrical signal converter 1 is a serious problem. It will explained hereinafter how the influence of these different properties can be reduced so that it is negligible.

The current generated in the base of the phototransistor 5 may be considered as a direct and alternating current component, respectively, through the base-emitter junction of the phototransistor 5. The value of the direct voltage across the diode 11 and, with a constant input direct current I, the value of the direct current through the base-emitter junction of the phototransistor 5 depend upon the stabilization circuit 13 which is DC-series connected with the diode 11. The differential resistance of a semiconductor junction is inversely proportional to the direct current through it. The diode 11 and the base-emitter junction of the phototransistor 5 are AC-parallel connected. The quotient of the direct current component and the alternating current component of the current through the diode 11 is then linearly proportional to the quotient of the direct current component and the alternating current component of the current through the base-emitter junction of the phototransistor 5. The proportionality (1) follows directly therefrom with a very large amplification factor of the phototransistor 5. This proportionality (1) express that the transmission direct current resistance of the converter 1 and the transmission alternating current resistance of the converter 1 are proportional to each other. It should be noted that the properties of the optocoupler do not occur in this proportionality (1). As a result, the influence of the spread of the transmission function, the aging phenomena and the temperature behaviour of optocouplers is strongly reduced in practice.

The stabilization circuit 13 adjusts the direct current component of the current through the diode 11. At a constant value of the direct current I through the light diode 4, the emitter current through the phototransistor 5 and hence the direct voltage component U at terminals 9 is determined. Two embodiments of a stabilization circuit 13 is adapted to stabilize this direct voltage component U are described more fully in FIGS. 2 and 3. At a constant value of the alternating current i through the light diode 4, the direct current components of the currents through the diode 21 and the base-emitter junction of the phototransistor 5 determine the respective differential resistance and hence the alternating voltage component u present at the pair of terminals 9 at the output of the converter 1. An embodiment of such a stabilization circuit 13 is adapted to stabilize this alternating voltage component u will be described more fully in FIG. 4.

The stabilization circuit 13 shown in FIG. 2 comprises a voltage divider consisting of resistors 15 and 16 connected between a first terminal $V_{ref}$ for connecting a reference direct voltage source not shown in this Figure to ground. The centre tap of the voltage divider is connected to terminal 12. For a satisfactory operation of the converter 1, current through the voltage divider should have value so that variation of the direct current component of the current through the diode 11 does not lead to substantially variation of the direct voltage at the connection terminal 12. This adjustment current is determined by the value of the direct voltage $V_{ref}$ and by the resistance value of the voltage divider.

The phototransistor 5 receives light, which is emitted by the light diode 4 due to a direct current I flowing throught the light dode 4. A direct voltage $V_{ref}$ should be present at the terminal $V_{ref}$ and this voltage is derived, for example, from the supply voltage at the terminal $V_+$. At a sufficient value of the adjustment current I through the light diode 4, a direct current will flow away through the diode 11 via the centre tapping on the voltage divider 15, 16. As a result, the voltage at the connection terminal 12 derived from the voltage $V_{ref}$ will be approximately equal to the output voltage U at the pair of terminals 9. The output voltage U thus only depends upon the voltage $V_{ref}$, for which is written $U = U(V_{ref})$. A direct consequence is that the phototransistor 5 cannot saturate because all the current generated in the base which is not used to assist in obtaining the output voltage U is drawn by the diode 11 via the stabilization circuit 13 from the base of the phototransistor 5. The stabilization circuit 13 thus determines the direct current component of the current through the main current path of the phototransistor 5. Due to the fact that, if the photosensitive element comprises a phototransistor 5, the latter cannot saturate, the possibility is obtained that the light diode 4 can be adjusted over a very wide adjustment current range, especially at a higher bias current, at which normally the phototransistor 5 saturates. This is also effective with the use of a laser diode as light diode 4 because laser diodes when adjusted above a given threshold current have a better linearity as the bias current adjustment is higher, as a result of which a very linear behavior can be obtained. The operation of the converter 1 can also be characterized by writing the proportionality (1) in the form:

$$\frac{I}{i}\bigg|_{input} \cdots \frac{U(V_{ref})}{u}\bigg|_{output} \quad (2)$$

From this it appears that, when $U(V_{ref})$ is kept constant, which function is fulfilled by the stabilization circuit 13, the alternating voltage component u at the pair of terminals 9 of the converter 1 linearly depends upon the quotient of the direct current component I and the alternating current component i of the current through the light diode 4. More particularly, at a given current adjustment of the light diode 4, a linear AC transmission adjustable by means of the reference direct voltage $V_{ref}$ is possible in an optically separated manner. Further, the direct voltage U is present at the pair of terminals 9 and this voltage can be switched by means of the input current I. The direct voltage U thus switchable can be utilized with the use of the opto-electrical signal converter 1 in, for example, telephone systems, especially as a switch hook signal for connecting the converter 1 to or disconnecting it from a telephone line. The converter 1 in this embodiment comprises a minimum number of electrical components. Exchange of one optocoupler for another optocoupler now does not influence the value of the output signal because this output signal according to the proportionality (2) is solely determined by the input signal.

FIG. 3 shows a second embodiment of a stabilization circuit 13 for use in a converter 1 as shown in FIG. 1. The stabilization circuit 13 shown in FIG. 3 comprises a low-pass filter 17 and a first subtraction device 18 connected in series therewith. The subtraction device 18, which comprises, for example, a differential amplifier, is provided with a first input 19. This first input 19 is connected through the low-pass filter 17 and the connection terminal 20 to the emitter between the terminal 20 and the emitter of the phototransistor 5 is indicated by a broken line. The subtraction device 18 is provided with a second input 21 connected to a second terminal $V_{ref}$ for connecting a second reference direct voltage source not shown in the Figure. The output signal derived by the subtraction device 18 from the difference between the direct voltage U and the second reference direct voltage $V_{ref}$ is supplied as a first direct voltage control signal to a variable resistor 23 which is provided with a control input 22 and forms part of the stabilization circuit 13. This variable resistor 23 is connected between the connection terminal 12 and the point of common potential. The stabilization circuit 13 determines, like in the first embodiment, the direct voltage component of the current through the main current path of the phototransistor 5. The stabilization on a level adjustable by the reference direct voltage $V_{ref}$ is effected in that the first direct voltage control signal influences the valve of the direct voltage component of the current through the diode 11. As a result, the direct current component of the current through the base-emitter junction of the phototransistor 5 and hence the direct voltage U is determined so that a DC feedback is obtained. Due to the fact that also in this case it holds that $U = U(V_{ref})$, the operation of the converter 1, like in the first embodiment, can be characterized by the proportionality (2), as a result of which a linear AC transmission has become possible in an optically separated manner. Also in this case, the exchange of one optocoupler for another optocoupler having properties different from those of the first optocoupler does not influence the value of the output signal because this output signal according to the proportionality (2) is solely determined by the input signal. It will be clear that exchange of the low-pass filter 17 and the subtraction device 18 in the stabilization circuit 13 does not change the operation.

The stabilization circuit 13 shown in FIG. 4 can also be used in the converter 1 as shown in FIG. 1. The stabilization circuit 13 shown in FIG. 4 comprises a high-pass filter 24, an AC/DC converter 25 connected to the high-pass filter 24 as well as a second subtraction device 27 connected by a first input 26 to this AC/DC converter 25. The high-pass filter 24 is connected to the connection terminal 20 and is connected via a connection indicated by a broken line in FIG. 1 to the emitter of the phototransistor 5. The subtraction device 27, which may be constructed in the same manner as the subtraction device 18 shown in FIG. 3, is provided with a second input 28 connected to a third terminal $V_{ref}$ for connecting a third reference direct voltage source not shown in the Figure. At the input 26 of the subtraction device 27 a signal is available consisting of a direct voltage whose value is derived from the effective value of the alternating voltage u at the output of the converter 1. The output signal of the subtraction device 27 comprises a second direct voltage control signal which is supplied to a variable resistor 30 forming part of the stabilization circuit 13 and provided with a control input 29. This variable resistor 30, which may be constructed in the same manner as the variable resistor 23, is connected between the connection terminal 12 and the point of common potential. The stabilization circuit 13 determines in the manner as described in the preceding embodiment the direct component of the current through the main current path of the phototransistor 5 and hence the direct voltage U. The direct voltage control signal determines also in this case the direct current components of the currents through the diode 11 and throught the base-emitter junction of the phototransistor 5. With a semiconductor junction, the differential resistance depends, as already explained, upon the direct current flowing through this junction. Consequently, the stabilization circuit 13 determines the differential resistance of the diode 11 and the differential resistance of the base-emitter junction of the phototransistor 5, as a result of which the alternating voltage u is determined and an AC feedback is obtained. Since now the alternating voltage u depends upon the reference direct voltage $V_{ref}$, there is written $u=u(V_{ref})$. The operation of the converter 1 can therefore be characterized by the proportionality:

$$\frac{I}{i}\bigg|_{input} \cdots \frac{U}{u(V_{ref})}\bigg|_{output} \qquad (3)$$

When the direct current I through the light diode 4 is modulated with the alternating current i having a constant amplitude, by which the stabilization circuit 13 stabilizes the alternating voltage $u(V_{ref})$, a linear DC transmission has become possible in an optically separated manner. Also in this case the exchange of one optocoupler for another optocoupler does not influence the value of the output signal u, U because this output signal u, U in accordance with the proportionality (3) is solely determined by the quotient of the direct current I and the alternating current i at the input of the converter i.

A particular embodiment of the variable resistors 23 and 30 is realized by the use of a field effect transistor, whose gate constitutes the control input of the variable resistor.

For a satisfactory operation of the opto-electrical signal converter 1, the working point of the phototransistor 5, which is determined by the direct current component of the current through the main current path of the phototransistor 5 can be adjusted by means of the reference direct voltage $V_{ref}$, should lie in the linear adjustment range of the phototransistor 5.

In general, the invention is not limited to the use of phototransistors 5 of the npn type, but phototransistors of the pnp type may also be used.

A following series of embodiments of the converter 1 is obtained if the phototransistor 5 is replaced by a transistor of a corresponding type. As a photosensitive element use may then be made, for example, of a light diode, which should be connected between the base of the transistor and a supply source.

What is claimed is:

1. In an opto-electrical signal converter for linearly converting an input signal which consists of an alternating current component superimposed on a direct current component into an output signal which consists of an alternating voltage component superimposed on a direct voltage component, of the type comprising a light transmitter which emits light corresponding to the input signal and a light receiver which responds to the light produced by the transmitter, the improvement wherein the light receiver comprises:
   a bipolar junction transistor, the collector of the transistor being connected to a potential source;
   photosensitive means which produce a current at the base of the transistor which corresponds to the light emitted by the transmitter;
   a first resistor connected from the emitter of the transistor to a point of common potential so that an output current consisting of alternating output current component superimposed on a direct output current component flows through the potential source, the collector-emitter path of the transistor, and the point of common potential;
   a semiconductor junction, a first side of which is connected to the base of the transistor so that the semiconductor junction, viewed from the base of the transistor, is connected to the photosensitive means in the same conductive sense as is the base-emitter junction of the transistor;
   stabilization circuit means, connected from a second side of the semiconductor junction to the point of common potential, which stabilize either the alternating output current component or the direct output current component at an adjustable level; and
   means which couple an AC potential at the second side of the semiconductor junction to the emitter of the transistor whereby a proportionality is maintained between the transmission direct current resistance of the transistor and the transmission alternating current resistance of the transistor.

2. The converter of claim 1 wherein the stabilization circuit means comprise a voltage divider which includes a second resistor connected from a reference voltage point to the second side of the semiconductor junction and a third resistor connected from the second side of the semiconductor junction to the point of common potential, whereby the direct output current component is stabilized at a level which is determined by reference voltage and the values of the second and third resistors.

3. The converter of claim 1 wherein the stabilization circuit means comprise:
- a low-pass filter having an input which is directly connected to the emitter of the transistor;
- subtraction means having a first input connected to the output of the low-pass filter and a second input connected to a reference voltage point; and
- an electrically controllable variable resistor having a control input connected to the output of the subtraction means, said variable resistor being connected from the second side of the semiconductor junction to the point of common potential so that the value of the variable resistor is subject to negative feedback whereby the value of the direct output current component is stabilized at a level which is determined by the reference voltage.

4. The converter of claim 1 wherein the stabilization circuit means comprise:
- a high-pass filter having an input connected to the emitter of the transistor;
- an AC-to-DC converter having an input connected to the output of the filter;
- subtraction means having a first input connected to the output of the AC-to-DC converter and a second input connected to a reference voltage point; and
- an electrically controllable variable resistor having a control input connected to the output of the subtraction means, said variable resistor being connected from the second side of the semiconductor junction to the point of common potential so that the value of the variable resistor is subject to negative feedback whereby the value of the alternating output current component is stabilized at a level which is determined by the reference voltage.

5. The converter of claim 1 wherein the semiconductor junction is a semiconductor diode having a first terminal which is connected to the base of the transistor and a second terminal and wherein the means which couple the AC potential comprise a capacitor connected from the second terminal of the diode to the emitter of the transistor.

6. A converter as claimd in any of the preceding claims wherein the bipolar junction transistor is a phototransistor and the photosensitive element comprises a photosensitive region of the phototransistor.

7. The converter of claim 6 wherein the bipolar junction transistor is an NPN phototransistor and the anode of the diode is connected to the base of the phototransistor.

8. The converter of claim 1 wherein the output signal is the voltage across the first resistor.

9. The converter of claims 3 or 4 wherein the variable resistor is a field effect transistor and the control input is the gate electrode of the field effect transistor.

* * * * *